United States Patent
Arbetter et al.

(10) Patent No.: US 6,191,569 B1
(45) Date of Patent: Feb. 20, 2001

(54) CIRCUIT AND METHOD FOR GENERATING ESTIMATED FEEDBACK FOR THE CONTROLLER OF A SLAVE POWER MODULE IN A MASTER/SLAVE PARALLELING SCHEME

(75) Inventors: Barry Steven Arbetter; Milivoje Slobodan Brkovic, both of Carlsbad, CA (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/454,274

(22) Filed: Dec. 3, 1999

(51) Int. Cl.$^7$ ........................................................ G02F 1/40
(52) U.S. Cl. ............................................ 323/272; 363/72
(58) Field of Search ............................... 323/272; 363/65, 363/69, 72

(56) References Cited

U.S. PATENT DOCUMENTS 5,079,686 * 1/1992 Vinciarelli ............................. 363/15

* cited by examiner

Primary Examiner—Peter S. Wong
Assistant Examiner—Gary L. Laxton

(57) ABSTRACT

A feedback circuit is included in paralleled power supply modules using a modified master/slave current sharing scheme. The feedback circuit is activated in the slave modules to force the internal control signal generated by each of the controllers acting as slaves to operate in a predetermined manner. This predetermined manner can be by adjusting the local control signal such that it approximates the master control signal, either by forcing it to follow the master control signal, or by separately regulating the local control signal to approximate the master control signal, or it can be by maintaining the local control signal at a predetermined value. The feedback circuit acts to prevent sudden changes in the output voltage when the master module fails and another module becomes master by placing its control signal on the current-share bus. If the control signal of the new master is too different from the previous control signal, the output voltage of the power supply could move outside the designed tolerances potentially causing the power supply to shut down.

16 Claims, 2 Drawing Sheets and# CIRCUIT AND METHOD FOR GENERATING ESTIMATED FEEDBACK FOR THE CONTROLLER OF A SLAVE POWER MODULE IN A MASTER/SLAVE PARALLELING SCHEME

TECHNICAL FIELD OF THE INVENTION

The present invention relates to power supplies. The present invention is a power supply made of parallel modules utilizing a master/slave paralleling scheme, and more specifically to a circuit and method for providing estimated feedback to the controllers of the slave power modules such that they maintain a regulation signal close to that of the master signal.

BACKGROUND OF THE INVENTION

More and more electronic applications are requiring distributed power architectures where the current requirements of the electrical loads are requiring the power supplies to be moved as close to the load as practicable. Instead of the single power supply which would accept ac line voltage and produce a dc or ac output voltage for use by an entire electrical system, today's ultra-fast electronics and electrical components often require their own power supply to accommodate the high transients in their load currents. This new concept in power systems is often referred to as a "distributed power architecture." This type of power architecture can be implemented by means of a system rectifier which converts the ac line current into an unregulated or slightly regulated dc voltage, and numerous "point-of-load" power supplies. The point-of-load power supplies accept the dc voltage from the rectifier and produce a highly regulated dc voltage which is able to accommodate very large current transients (large di/dt).

The point-of-load power supplies need to be small, have a high power density, and be mountable on the circuit boards near the load. In addition, the point-of-load power supplies should be modular to allow two or more to be connected in parallel to supply power to high current loads. This modularity allows a single design to be adapted for loads with varying current requirements. The problem with placing power supply modules in parallel is getting the modules to share current effectively.

Small variances in component values or reference levels will cause one or two paralleled power supplies to supply the majority of load current while some of the remaining modules supply relatively little, or no, current. This disparity in load currents causes the modules supplying the majority of the current to wear faster due to the increased thermal stresses, leading to premature failures in the field. Accordingly, several methods have been tried to force parallel power supply modules to share load current evenly.

A method of current sharing involves master/slave schemes where the "master" module provides the control information used by each of the "slave" modules. One such master/slave scheme is described in U.S. patent application Ser. No. 09/350,840 by Brkovic where each of the modules is capable of acting as either a master or a slave, and upon a failure of the master module, one of the slave modules becomes the master. This system prevents the single point of failure problem associated with other master/slave schemes and prevents the need for two types of modules. In the instance where a master module fails, however, there could be a problem if the new master module's control signal does not closely approximate the previous master's control signal because it had been bypassed as a slave module. This could cause the output voltage of the power supply to move outside the acceptable range potentially causing the power supply to shut down.

The same problem exists for current sharing schemes which place all of the parallel modules control signals on the current share bus and then "or"/"and" the signals together to obtain the "master" control signal used by the parallel modules. In this scheme there may not be a specific module designated as the "master" but the module with the largest or smallest duty cycle is respectively, effectively the master since the master control signal obtained after the "or"/"and" function will track the longest/shortest duty cycle. The modules with the different duty cycles need to have their local control signals regulated to ensure that they are close to the master control signal.

Accordingly, what is needed is a circuit and a method for approximating the output voltage feedback in the controllers of power modules whose local control signal is not being used so that their local control signal approximates the "master" control signal which is either generated by the master module or derived by a logic function.

SUMMARY OF THE INVENTION

The present invention provides a circuit and a method for providing current sharing between parallel power supplies using a modified master/slave scheme in which the local control signal of any of the parallel modules can be utilized as the "master" control signal. A current-share circuit is incorporated into the controller of each power supply. The controller of each power supply produces a local control signal that is used to regulate the output voltage of the power supply. Each of the parallel power supplies is interconnected to the other power supply modules on a current-share bus. One of the modules has its local control signal used as the "master" control signal while the control signals of the remaining, or "slave", modules are bypassed.

A feedback circuit is activated in the slave modules to force the control signal generated by the local controller to operate in a predetermined manner. This predetermined manner can be forcing the control signal to approximate the master control signal on the current-share bus, either by forcing the local control signal to mirror the master control signal or by independently regulating the local control signal, or it can be by forcing the control signal to operate at a predetermined level such as a predetermined duty cycle for PWM controllers. The feedback circuit acts to prevent sudden changes in the output voltage when the module providing the master control signal fails and another module's local control signal becomes master by having its control signal placed on the current-share bus. If the new master control signal is too different from the previous control signal, the output voltage of the power supply could move outside the designed tolerances potentially causing the power supply to shut down.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
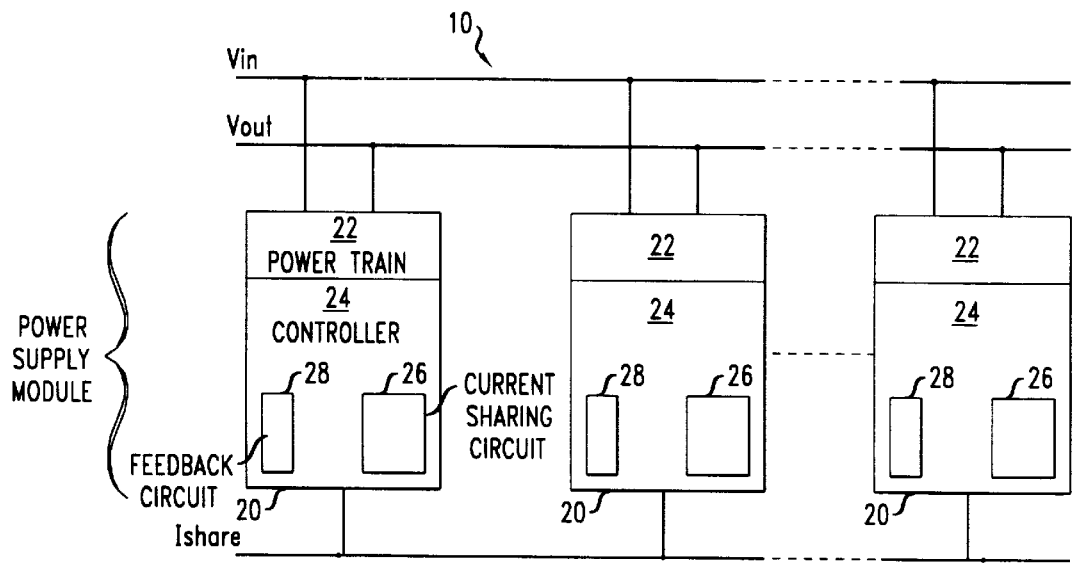
FIG. 1 is a block diagram of a power system formed by multiple parallel power supply modules which incorporate the present invention.

Referring now to FIG. 1, a power system 10 is shown which accepts an input voltage $V_{in}$ and converts the input voltage $V_{in}$ into a regulated output voltage $V_{out}$ which is used to power a load (not shown). Power system 10 is formed by a plurality of power supply modules 20, which are connected in parallel for increased current capacity over the current capacity of a single power supply module. In addition to input voltage $V_{in}$ and output voltage $V_{out}$ connections, the power supply modules 20 are interconnected along current-share bus $I_{share}$.

Without current-share bus $I_{share}$, power supply modules 20 would not evenly share the current provided to the load on the $V_{out}$ bus. One or more modules would likely operate in or near current limit while other power supply modules would supply little or no current. Those power supply modules supplying the majority of the load current would suffer much greater thermal stresses than the other modules and would be prone to premature failure. The current-share bus $I_{share}$, along with current-share circuit 26 discussed below, allow power supply modules 20 to work together to provide a load current that is evenly distributed between power supply modules 20.

A power train 22 and a controller 24 are included in each of the power supply modules 20. For power supply modules constructed according to the present invention, controller 24 includes current sharing circuit 26. Power train 22 operates to convert the input voltage $V_{in}$ into a tightly regulated output voltage suitable for powering a load. Power train 22 can be any suitable isolated or non-isolated, ac-to-dc, dc-to-dc, or dc-to-ac converter topology such as are well known in the art.

Power train 22 is controlled by controller 24, which acts to operate power train 22 in order to keep output voltage $V_{out}$ tightly regulated. Controller 24 can also be any suitable controller as are well known in the art, such as a pulse width modulated ("PWM") controller. For illustrative purposes only, the controller for the power supply module according to the present invention will be assumed to be a PWM controller. Controller 24 of the present invention includes current-share circuit 26, which is connected between controller 24 and the current-share bus $I_{share}$, and feedback circuit 28 which is connected to current-share circuit 26 and controller 24.

Current-share circuit 26, in each power supply module 20, uses current-share bus $I_{share}$ to operate power supply modules 20 in a modified master/slave scheme. In a master/slave current sharing scheme, one power supply module is a dedicated "master" which shares current information, usually in the form of an error signal, to the other power supply modules which are the "slave" modules. In the present invention's modified master slave scheme, there is no dedicated master module. Instead, the current-share circuit 26 allows each power supply module 20 to "race" to become the master by having each power supply module 20 place its internal control signal on the current-share bus $I_{share}$. Also, unlike standard master/slave schemes that place an error signal on the bus, the present invention's modified scheme has each module place its actual local control signal, for example a PWM signal, on the current-share bus $I_{share}$.

Each current-share circuit 26 recognizes when another module's control signal has reached the bus before its own and acts to disconnect its power supply module's local control signal from the bus, thereby becoming a slave to the master module for as long as the master continues to generate a control signal. If the master's control signal disappears from the bus, each current-share circuit reconnects its local control signal to the bus for another race to become master.

While the modules are acting as slaves, they are using the control signal off generated by the master module which is on the $I_{share}$ bus, resulting in their own local controls signals being bypassed. During the period that the module acts as a slave its own local control signal is not regulated and can, therefore, have a duty cycle that is significantly different from the control signal of the master module. Normally, this does not affect the operation of the power supply, but in the case of a failure in the master module, all the slave modules race to the $I_{share}$ bus to attempt to become master. The module that wins the race has its local control signal placed on the $I_{share}$ bus, and if that control signal is significantly different than that of the master module before failure, the output voltage of the power supply could be forced outside the acceptable operating range, potentially shutting down the power supply.

In order to keep the local control signals of the slave modules from drifting significantly away from the master control signal, feedback circuit 28 is placed in controller 24 and activated when current-sharing circuit 26 indicates that the module is acting as a slave. Feedback circuit 28 simulates the output voltage and generates an error signal that is sent to the control signal generator of the controller, which can be a pulse width modulator, in order to keep the duty cycle within a desired range.

Feedback circuit 28 can operate in essentially two ways. First, feedback circuit 28 can attempt to approximate the master control signal on the current share bus $I_{share}$. This approximation can be accomplished by either simulating the output voltage at the local controller or by directly forcing the local control signal to follow the master control signal. Alternatively, feedback circuit 28 can attempt to maintain the duty cycle of the slave controller to a predetermined value, such as a 50% duty cycle, which can also be adjusted to account for variations in the operating conditions.

Figure 2:
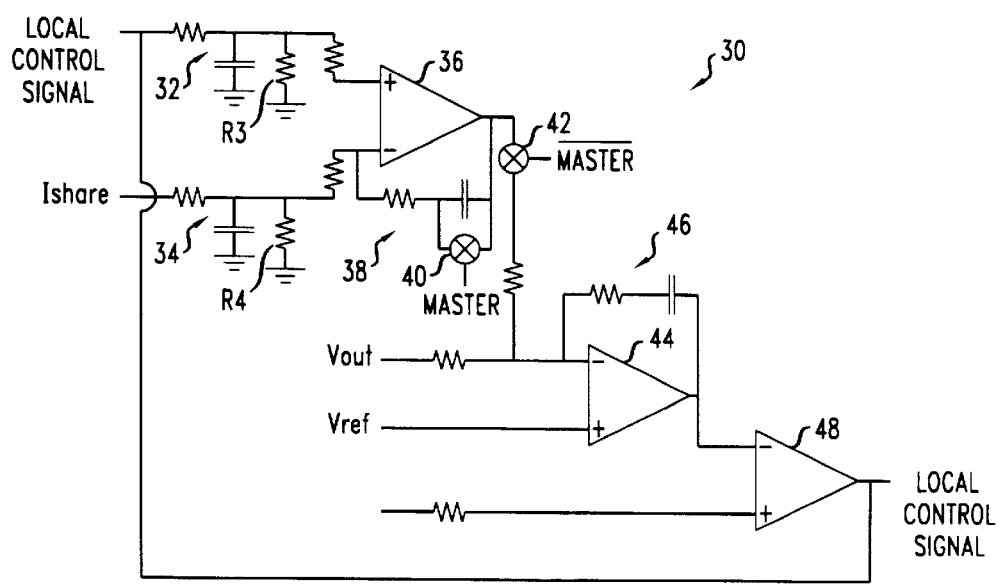
FIG. 2 is a circuit diagram of a feedback circuit in accordance with the principles of the present invention.

Referring now to FIG. 2, an embodiment of feedback circuit 28 is shown. Circuit 30 is an embodiment of the first type of feedback circuit described, as it attempts to force the local control signal to mirror, or follow, the master control signal appearing on the current share bus $I_{share}$, thereby forcing the controller of the slave modules to approximate the duty cycle of the master controller. The duty cycles of the master controller, as it appears on bus $I_{share}$, and the local controller are filtered by filters 34 and 32, respectively, and then compared by error amplifier 36. Resistors R3 and R4 are chosen to match the amplitudes of the local control signal and the master control signal. Error amplifier 36 uses feedback circuit 38 to generate a signal indicative of the difference between the master control signal and the local control signal. Analog switch 42 is controlled by the local current-sharing circuit and is turned on when the module is acting as a slave, as shown by signal master equal to zero. Signal master also controls switch 40, which acts to bypass the capacitor of feedback circuit 38 when the module is acting as master.

When analog switch 42 is conducting, meaning the module is functioning as a slave, the signal from error amplifier 36 is added to output voltage reference $V_{out}$. Output reference voltage $V_{out}$ is compared to a reference voltage $V_{ref}$ by error amplifier 44 using feedback circuit 46 which generates an error signal fed to modulator 48. Modulator 48 is used to generate the local control signal. As can be seen, when the module is acting as a slave the difference between the master and local control signal is used to adjust the local control signal by adding it to the sensed output voltage, thereby forcing the local control signal to track the master control signal as it appears on bus $I_{share}$. If there is a failure of the master module and the local control signal of the module which becomes the new master is approximately the value of the master control signal on bus $I_{share}$, the power supply's output voltage will not be adversely affected.

Figure 3:
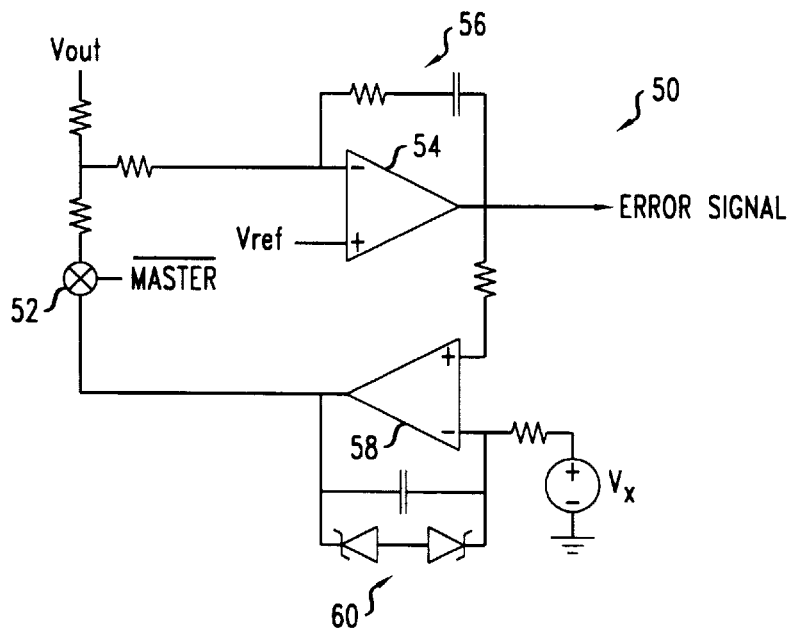
FIG. 3 is a circuit diagram of an alternate feedback circuit in accordance with the present invention.

Referring now to FIG. 3, another embodiment of feedback circuit 28 from FIG. 1 is shown. Circuit 50 is an example of the second type of feedback circuit which acts to maintain the local control signal at a fixed duty cycle. Circuit 50 includes error amplifier 54 which compares reference voltage $V_{ref}$ with sensed output voltage $V_{out}$ to generate an error signal used by the local control to generate the local control signal. Analog switch 52 is controlled by the local current sharing circuit and when signal master is zero, indicating that the module is acting as a slave, switch 52 is closed, or on, allowing the output of error amplifier 58 to modify the sensed output voltage. Error amplifier 58 compares the generated error signal with a preselected voltage $V_x$. Voltage $V_x$ can be a fixed voltage such as the midpoint voltage of an oscillator, or it can be a fixed voltage adjusted by other circuit parameters such as changes in the output voltage or input voltage. If the error signal differs from voltage $V_x$ and the module is acting as a slave, the output of error amplifier 58 is added to the sensed output voltage $V_{out}$ in order to alter the error signal such that it maintains a predetermined duty cycle according to the value set by voltage $V_x$, and potentially adjusted for variations in the input voltage, output voltage or other operating condition.

Voltage $V_x$ can be set to force the controllers of each slave module to operate at an average system duty cycle or at a constant 50% duty cycle to ensure that upon a failure by the master module, the duty cycle of the new master should already be close to needed value. By ensuring that the duty cycles are close to the necessary value, circuit 50 prevents large changes in the output voltage of the power supply, which could otherwise be caused by a failure of the master module when the new master's control signal is placed on the bus $I_{share}$.

Figure 4:
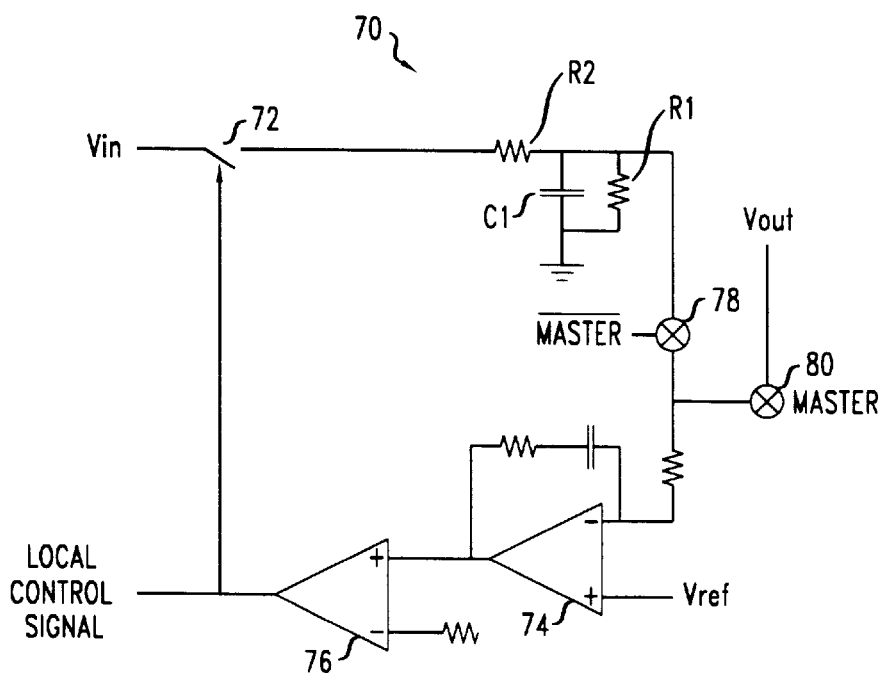
FIG. 4 is a circuit diagram of a second alternate feedback circuit in accordance with the present invention.

Referring now to FIG. 4, another embodiment of feedback circuit 28 is shown. Like circuit 30 shown in FIG. 2, circuit 70 is used such that the local control signal approximates the master control signal that appears on the $I_{share}$ bus. Circuit 70, however, is illustrative of a feedback circuit in which the local slave control signal approximates the master control signal by regulating a voltage which is related to the output voltage in order to simulate an output voltage for the power module's error amplifier. The input voltage $V_{in}$ is related to the output voltage and is used by circuit 70 to approximate the master control signal. Although the input voltage is shown in FIG. 4, one skilled in the art would understand that any voltage that has a relationship with the output voltage could be used.

Circuit 70 uses switch 72, resistors R1 and R2 and capacitor C1 to mimic the function of a buck type converter in order to force the local control signal to approximate the master control signal. Switch 72 is controlled by the local control signal and capacitor C1 simulates an output capacitor across which a voltage related to the output voltage is generated. The voltage across capacitor C1 is compared to a reference voltage $V_{ref}$ by the power module's error amplifier 74 and the error signal generated by error amplifier 74 is fed to modulator 76 which produces the power module's PWM signal labeled here as local controller.

Switches 78 and 80 determine whether error amplifier 74 sees the fake output voltage across C1 or the real output voltage $V_{out}$, depending on whether the module is acting as a master or a slave. Switch 78 is on when the power module is acting as a slave and connects the "fake feedback" to the module's error amplifier 74. When the power module is acting as the master module, switch 78 is off and switch 80 is turned on connecting error amplifier 74 to the output voltage $V_{out}$.

Circuits 30, 50 and 70 of FIGS. 2, 3 and 4 respectively, are meant only to illustrate the types of feedback circuits contemplated by the present invention. One skilled in the art will understand that other circuits could be described which would accomplish the same role as circuits 30, 50 and 70 without departing from the scope of the invention. The circuits of FIGS. 2, 3 and 4 shown as illustrative types of feed back circuits to show that feedback circuits can be created to account for a variety of design considerations without departing from the scope of the present invention. The feed back circuit shown in FIG. 2 is capable of closely tracking the master control signal which eliminates the need for a significant external capacitance. The feedback circuits of FIGS. 3 and 4 would not necessarily track the master control signal as closely and would therefore require additional external capacitance to supply the load should there be an interruption in the master control signal requiring another control signal to become master. While the feedback circuits of FIGS. 3 and 4 would require additional capacitance which would degrade system performance, they may be preferable as less expensive implementations.

While FIGS. 1 through 4 have been described using a current sharing scheme in which a module is designated master and only its control signal appears on the current share bus, one skilled in the art would recognize that the present invention and feedback circuits described would work equally as well in a current sharing scheme where all the control signals were placed on the current share bus and then "or"ed to determine the master control signal. In fact, one skilled in the art would recognize the value of the present invention in any current sharing scheme where the local control signals of some of the modules are allowed to "float" while the system utilized the control signal of another module. Further, while the sensed output voltage $V_{out}$ has been shown in FIGS. 3 and 4, one skilled in the art would understand that the sensed output voltage could be the output voltage or it could be an approximation of the output voltage generated from the input voltage through well-known power circuit techniques.

All of the elements shown in FIGS. 2, 3 and 4 are common electrical components commonly available though any electrical component supplier. Those skilled in the art should understand that the previously described embodiments of power supply module 20, power train 22 and controller 24 are submitted for illustrative purposes only, and other embodiments are capable of providing these functions, thus providing a regulated output voltage to a load from an input voltage, are well within the broad scope of the present invention.

Although the present invention has been described in detail, those skilled in the art should understand that they can make various changes, substitutions and alterations herein without departing from the spirit and scope of the invention in its broadest form.

We claim:

1. A power supply for providing a regulated output voltage from an input voltage, comprising:
   a first power module having a first power train and a first controller generating a master control signal;
   at least one additional power module connected in parallel with the first power module, and including a local power train and a local controller generating a local control signal, wherein the local controller is capable of being bypassed such that the local power train is controlled by the master control signal;
   a feedback circuit in the at least one additional power module connected to the local controller that acts to modify the local control signal to substantially equal the master control signal when the local control signal is not controlling the local power train.

2. The power supply of claim 1 wherein the feedback circuit acts to modify the local control signal by making it approximate the master control signal.

3. The power supply of claim 2 wherein the feedback circuit modifies the local control signal to approximate the master control signal by forcing the local control signal to directly follow the master control signal.

4. The power supply of claim 2 wherein the feedback circuit modifies the local control signal to approximate the master control signal by forcing the local control signal to regulate to a voltage related to the output voltage.

5. The power supply of claim 1 wherein the feedback circuit acts to modify the local control signal by making it operate at a predetermined value.

6. The power supply of claim 1 wherein the first controller and the local controller are pulse width modulated controllers and the master control signal and the local control signal are pulse width modulated signals.

7. The power supply of claim 1 wherein the feedback circuit includes first and second error amplifiers, the first error amplifier comparing the master control signal and the local control signal and generating a first error signal indicative of the difference, and wherein the second error amplifier compares the sum of the first error signal and a sensed output voltage to a reference voltage, thereby generating a second error signal which is used by a modulator to generate the local control signal.

8. The power supply of claim 4 wherein the feedback circuit includes a switch and a capacitor, the switch being controlled to create a simulated output voltage across the capacitor, an error amplifier comparing the simulated output voltage to a reference voltage and generating an error signal which is used by a modulator to generated the local control signal.

9. The power supply of claim 5 wherein the feedback circuit includes first and second error amplifiers, the first error amplifier comparing an error signal and a preselected voltage and generating a signal indicative of the difference, the second error amplifier comparing the sum of the output voltage and the signal indicative of the difference with a reference voltage and generating the error signal which is used to generate the local control signal.

10. A method for sharing current between parallel power supply modules which are interconnectable by a current-share bus, each of the power supply modules including a local controller and a feedback circuit, the method, comprising:
    a) generating a local control signal within each of the parallel power supply modules using the local controller of that power supply module;
    b) selecting one of the local control signals from one of the power supply modules to act as a master control signal; and
    c) modifying the remaining local control signals of each of the remaining power supply modules using the respective feedback circuit of the remaining power supply modules to substantially equal the master control signal.

11. The method of claim 10 wherein each of the parallel power supply modules further includes a current-sharing circuit connected to the local controller thereof and operable in a master/slave current-sharing scheme, and wherein modifying the remaining local control signals of each of the remaining power supply modules occurs when the current-sharing circuit indicates that the power supply module is acting as a slave module.

12. The method of claim 10 wherein modifying the remaining local control signals involves making it approximate the master control signal.

13. The method of claim 12 wherein modifying the remaining local control signals to approximate the master control signal is accomplished by forcing the remaining local control signals to directly follow the master control signal.

14. The method of claim 12 wherein modifying the remaining local control signals to approximate the master control signal is accomplished by forcing the remaining local control signals to regulate to a voltage related to the output voltage.

15. The method of claim 10 wherein modifying the remaining local control signals involves making it operate at a predetermined value.

16. The method of claim 10 wherein the local controllers of each of the power supply modules are pulse width modulated controllers and the local control signals are pulse width modulated control signals.

\* \* \* \* \*